Sept. 8, 1925.
R. T. TUCKER
1,552,969
WASHER PLACING MACHINE FOR RUBBER HEEL MOLDS
Filed March 2, 1925    2 Sheets-Sheet 1
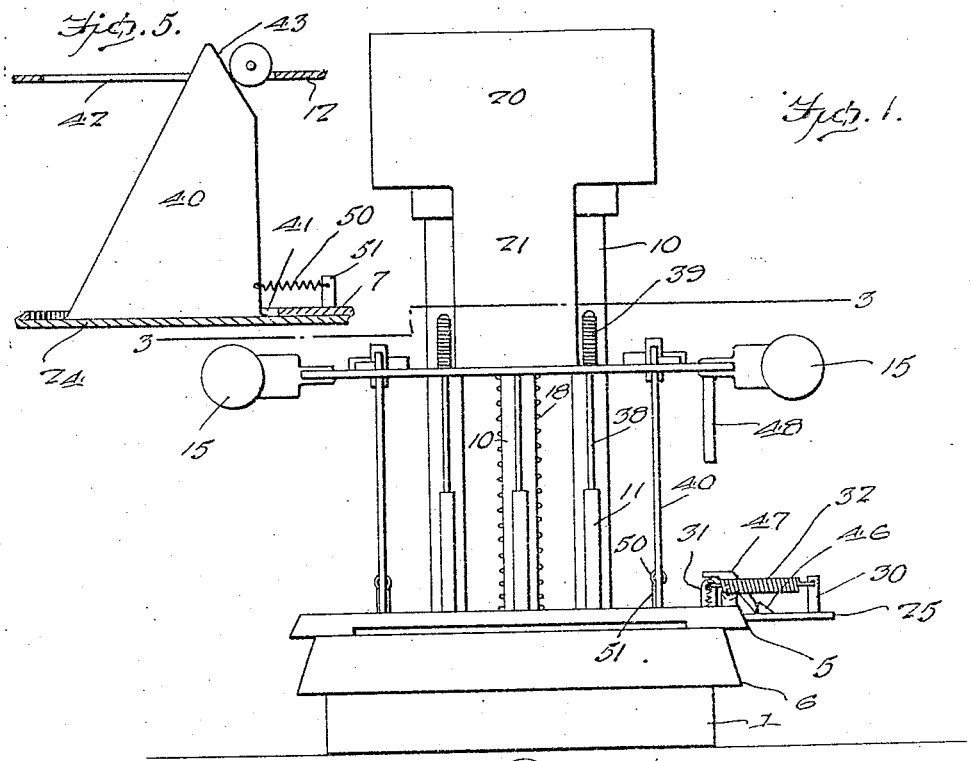
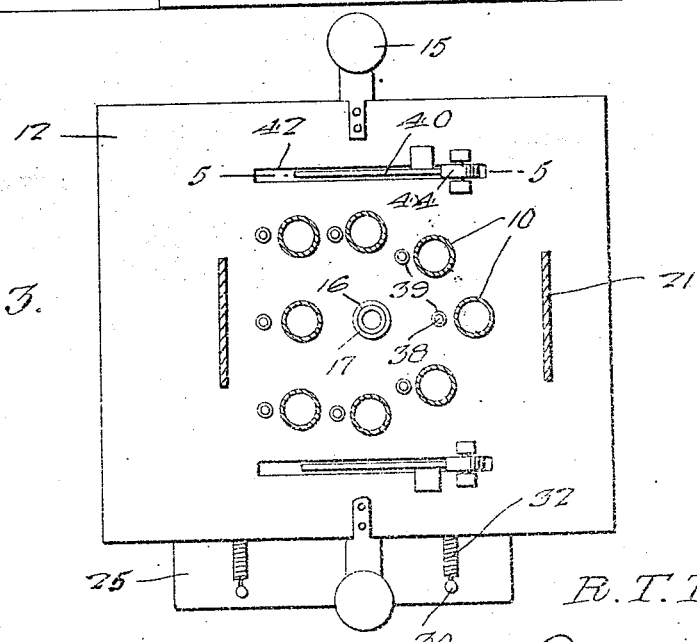
Inventor
R. T. Tucker
By
Attorney

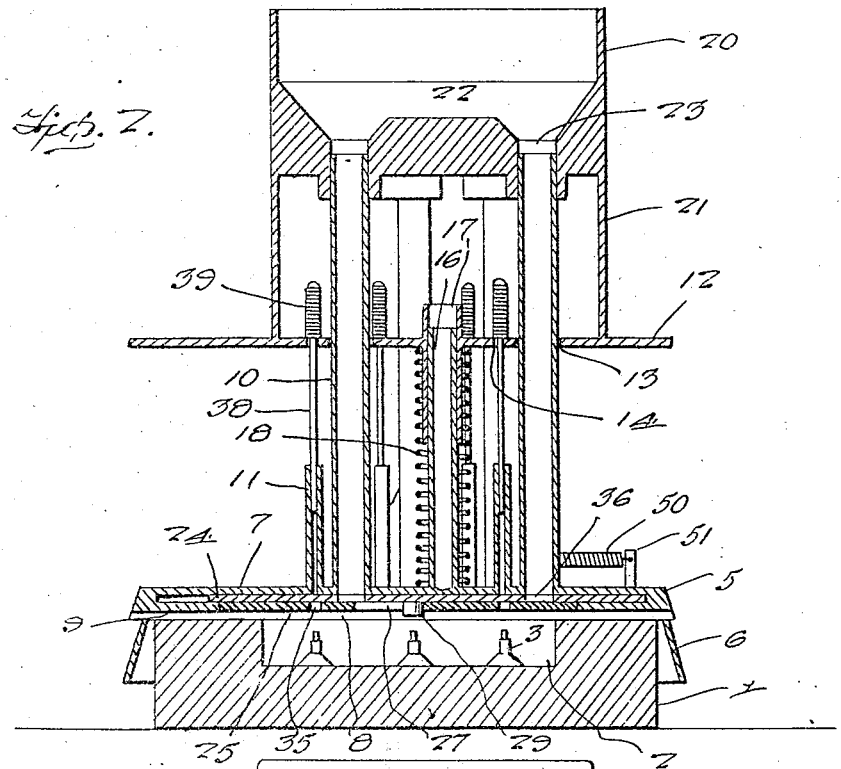
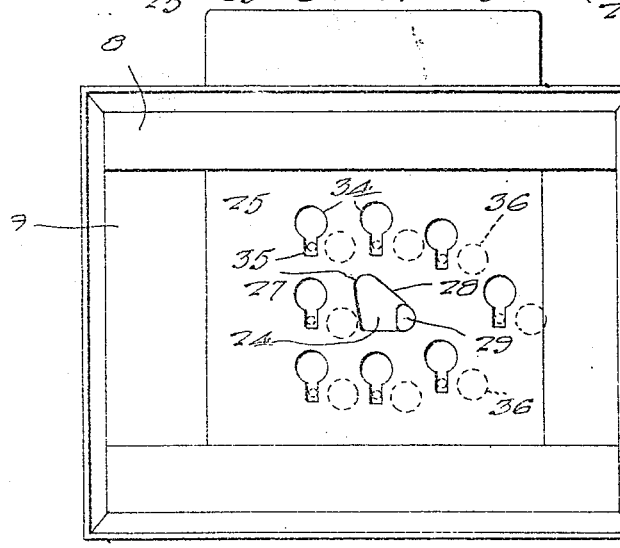

Patented Sept. 8, 1925.

1,552,969

UNITED STATES PATENT OFFICE.

ROBERT T. TUCKER, OF ROYSTON, GEORGIA.

WASHER-PLACING MACHINE FOR RUBBER-HEEL MOLDS.

Application filed March 2, 1925. Serial No. 12,636.

*To all whom it may concern:*

Be it known that ROBERT T. TUCKER, a citizen of the United States, residing at Royston, in the county of Franklin and State of Georgia, has invented certain new and useful Improvements in a Washer-Placing Machine for Rubber-Heel Molds, of which the following is a specification.

The present invention appertains to a machine for placing the washers in the mold for a rubber heel.

The principal object of the machine is to provide a labor saving device which in a single operation will properly distribute the washers in the molds.

Another important object of the invention is to provide a machine embodying a feed structure having a hopper in which a supply of the washers may be carried and properly fed to the machine so as to be distributed in the mold thereby.

Another important object of the invention is to provide a machine of this nature having means incorporated therein for properly centering the washers and guiding them as they fall from the machine into the mold.

A still further important object of this invention is to provide a machine of this nature having an extremely simple and efficient structure, one which is fairly reliable in operation, capable of being manufactured at a comparatively low cost, not liable to readily get out of order, durable, light, and otherwise well adapted to the purpose for which it is designed.

With the above and numerous other objects in view which will appear as the description proceeds, the invention resides in certain novel features of construction, and in the combination and arrangement of parts as will be hereinafter more fully described and claimed.

In the drawing,

Figure 1 is an elevation of the machine embodying the features of my invention,

Fig. 2 is a vertical section therethrough,

Fig. 3 is a horizontal section taken substantially on the line 3—3 of Fig. 1 looking downwardly, Fig. 4 is a bottom plan view of the machine, Fig. 5 is a detail vertical section taken substantially on the line 5—5, of Fig. 3 looking in the direction of the arrows.

Referring to the drawing in detail it will be seen that 1 designates a rubber heel mold of conventional construction having the usual cavity 2 therein and washer receiving elements 3.

My improved machine is adapted to be placed over the mold 1 as is shown to advantage in Figs. 1 and 2. The base 5 of the machine is provided with a depending apron 6 extending thereabout adjacent its edge and flared outwardly for forming a guide so as to properly center the machine on the mold 1 when placed thereover. This base 5 includes the upper plate 7 which is provided with bottom strips 8 therebelow and strips 9 resting on strip 8 and spaced below the plate 7. This base 5 including the plate 7 and strips 8 and 9 may be made integral if so desired. Washer receiving tubes 10 rise from the plate 7 and are equal in number to the number of the washer receiving elements 3 in the mold with which the machine is to be used. These tubes 10 are arranged in substantially the same manner on the plate 7 as the elements 3 are arranged in the mold, however, the tubes 10 are not arranged in alinement with these elements but rather to one side thereof as is indicated in Fig. 2 for a purpose which will be evident as the description proceeds.

Guide tubes 11 also rise from the plate 7 and one tube 11 is arranged in close proximity to each tube 10. The tubes 11 are vertically alined with the elements 3 in the mold as is evident from an inspection of Fig. 2. The tubes 10 and 11 communicate with the space below the plate 7 by the provision of suitable openings therein of equal size with the bores of these tubes.

It is preferable to permanently attach the tubes 10 and 11 to the plate 7 although this does not form an essential feature of my construction.

A plate 12 is provided with a plurality of openings 13 and 14. The tubes 10 project through the openings 13 so that the plate is slidable on these tubes toward and away from the base 5. Suitable handles 15 are provided on the opposite edges of the plate 12 for manual actuation thereof. A standard 16 rises perpendicularly from the base 5 and extends through a sleeve 17 provided in an intermediate portion of the plate 12 and disposed perpendicularly thereto. This sleeve 17 slides over the standard 16 and forms the main guide for the plate 12. A coiled spring 18 is disposed about the standard 16 and about the lower portion of the sleeve 17 and impinges against the bottom of the plate 12 and the top of the plate 7 of the base 5 so as to normally hold the plate 12 in its uppermost raised position in relation to the plate 7. A hopper 20 is supported above the plate 12 by legs 21 or in any other suitable manner. This hopper 20 is provided with a bottom guide portion 22 having formed therein guide troughs 23 terminating in cylindrical portions which slidably receive the upper portions of the tubes 10. This hopper 20 is to be filled with a supply of the conventional form of washers which will be fed into the tubes 10 in a manner which is quite evident from an inspection of Fig. 2 and will become even more evident as the operation of the machine is hereinafter explained.

A plate 24 is slidably mounted in base 5 between the plate 7 and strips 9 and a plate 25 is slidable between the plate 24 and the strips 8. The edges of the plate 25 slide along the inner longitudinal edges of the strip 9 being in the same plane therewith as is evident from an inspection of Figs. 2 and 4, and this plate projects beyond one side of the base as is indicated to advantage in both Figs. 1 and 4. A pin and slot connection is formed between the plates 24 and 25 so that when the plate 24 is moved in one direction the plate 25 will be moved in a direction at right angles thereto. This pin and slot connection may best be understood by an inspection of Figs. 2 and 4, wherein it will be seen that in the present arrangement a substantially triangular shaped slot 27 is provided in the plate 25 having the slanting, inclined, or cam edge 28 engageable by a pin 29 projected from the plate 24. A pair of lugs 30 rise from the outer end of the plate 25 and a similar pair of lugs 31 rise from the base 5 and springs 32 connect the lugs 30 and 31 and normally urge the plate 25 inwardly so that when the plate 24, as shown in Fig. 4 is moved to the left, the springs 33 will move the plate 25 toward the bottom of said figure during which operation the pin 29 moves along the inclined edge 28 of slot 27. Now when the plate 24 is moved to the right, still referring to Fig. 4, the pin 29 will move along the inclined edge 28 and move the plate 25 toward the top of said figure or outwardly thereby placing the springs 32 under further tension.

The plate 25 is provided with a plurality of circular openings 34 having radially extending slots 35. The plate 24 is provided with a plurality of circular openings 36. The openings 34 and 36 are arranged in their respective plates in a manner similar to the arrangement of the tubes 10 on plate 7 and the openings 36 are normally in registry with the tubes 10 as is indicated in Fig. 2 while the openings 34 are normally out of register with the openings 36 and tube 10.

A plurality of pins 38 project through the plate 12, one adjacent each tube 10 and springs 39 are connected at their bottom ends to the plate 12 and at their top ends to the top ends of the pins 38 and the bottom ends of these pins 38 project into the guide tubes 11.

By referring particularly to Figs. 3 and 5 it will be seen that a pair of standards 40 rise from the plate 24 and project vertically through the elongated slots 41 in plate 7 and through similar slots 42 in plate 12. Adjacent the upper ends of these standards 4 there are provided slanted, beveled, or cam edges 43 to be engaged by rollers 44 journaled on top of the plate 12, one at the end of each slot 42. It will thus be seen that when the handles 15 are pushed downwardly and the plate 12 therefore moves downwardly, the rollers 44 will engage the inclined edges 43 so as to move the standards 40 and the plate 24, this movement of the plate 24 being to the left as illustrated in Fig. 4 previously referred to in describing the operation of plate 24.

A stop lug 46 is provided on the outer portion of the plate 25 and is normally engaged by a spring pressed dog 47 which normally holds the plate in its outwardly extending position as illustrated in Fig. 1.

A release rod 48 depends from the plate 12 so that when this plate is moved downwardly this rod will engage the dog and release it from the top 46 and allow the springs 32 to move the plate 25 inwardly as previously described.

The details of the preferred embodiment of this invention have now been described sufficiently in order that its operation may be clearly understood. The washers are poured into the hopper 20 until the same is filled or contains a desired number and the machine is ready for operation. The machine is placed over the mold 1 and the guide apron 6 will properly center the same on the mold so that the tubes 11 are vertically alined with the washer receiving elements 3. When in this position the handles 15 are pushed downwardly at which time the plate 12 moves downwardly and the rollers 44 thereon engage the inclined edges 43 of the standards 40 thereby sliding plate 24, it being understood, of course, that there is a washer located in each opening 36 of this plate 24 having been delivered thereto through the tubes 10 by means of gravitation. These washers which are now located in the openings 36 rest upon the plate 25 which will remain stationary until the plate 24 has progressed considerably. The distance between the lower ends of the pins 38 and the distance between the lower end of the release rod 48 and its cooperating pawl or dog 47 are such that the plate 25 is not released until after the pins 38 have projected through the openings of the washers located in the openings 36 and of course the springs 39 are provided so that the plate 12 may be pushed down still further and allow the release rod 38 to actuate the dog 47 out of engagement with the stop 46. As soon as the dog 47 is released from the stop 46 the springs 32 move the plate 25 inwardly of the base 5 because of the movement of the pin 29 previously by the plate 24 and the openings 34 come into registry with the openings 36 and the washers are free to drop onto the elements 3. In this connection it is to be noted that the slots 35 allow the pins 38 to be projected downwardly therethrough as soon as the openings 36 in the plate 34 are moved over in registry with the tubes 11 and elements 3, this being true because the springs 39 are stretched or under tension as the plate 12 is moved downwardly and the lower ends of the pins 38 engage the plate 34 because projecting through the openings in the washers and when engaged in these openings of the washers, they project downwardly and engage with the tops of the elements 3 and the springs 39 are further tensioned as the plate 12 is further moved downwardly so as to allow the releasing rod 48 to engage the dog 49.

It is thought that the construction and operation of the invention should now be clearly understood without a more detailed description thereof.

It will be apparent from the above that I have devised a very efficient machine of this nature which is fairly reliable for the purpose designed and that it is efficient in its operation, not liable to readily get out of order, strong, durable, and capable of being manufactured at a relatively low cost in comparison to the amount of labor saved thereby. It will also be apparent that I have obtained all of the features of advantage enumerated as desirable in the statement of the invention, and that numerous changes in the details of construction, and in the combination and arrangement of parts may be resorted to without departing from the spirit or scope of the invention as hereinafter claimed or sacrificing any of the advantages thereof.

It is to be noted that springs 50 are attached to the standards 40 and to lugs 51 and will be brought under tension when plate 12 is moved downwardly toward the base 5 so that when the plate 12 is moved upwardly, these springs will return the plate 24 to its normal position thus causing the inclined edge 28 of the plate 25 to be actuated upon by the pin 29 so that the plate 25 will be extended to its normal position placing the springs 32 under tension and allowing the stop 46 to be again engaged by the dog 47.

Having thus described my invention, what I claim as new is:—

1. In a machine of the class described, a base, a plurality of tubes extending from the base, a plate having openings therein normally registering with the tubes, a second plate below the first plate having openings therein normally out of registry with the first plate, and means for moving the first plate out of registry with the tubes and then moving the second plate with its openings in registry with the openings of the first plate.

2. In a machine of the class described, a base, a plurality of tubes extending from the base, a plate having openings therein normally registering with the tubes, a second plate below the first plate having openings therein normally out of registry with the first plate, means for moving the first plate out of registry with the tubes and then moving the second plate with its openings in registry with the openings of the first plate, and guide means projectable through the openings when in registry.

3. In a machine of the class described, a base, a plate slidable below the base and provided with an opening, a tube extending upwardly from the base and registered with the opening in the plate, a second plate having an opening normally out of registry with the opening in the first plate, a third plate slidable on the tube, a pin resiliently carried by the third plate and depending therefrom, and means actuatable upon movement of the third plate downwardly toward the base for moving the first plate with its openings out of registry with the tube and moving the second plate with its opening of the first plate, said pin being then projected through the openings.

4. In a machine of the class described, a base, a delivery means associated with the base, a plate slidably associated with the base in one direction and having an opening normally registered with the delivery means, a second plate slidably mounted to move in a direction rectangular to the direction of movement of the first plate and provided with an opening normally out of registry with the opening of the first plate, a pin and slot connection between the two plates, spring means for normally urging the second plate to move rectangularly in relation to the first plate, releasable means for holding the second plate in its normal position, means for moving the first plate so that its opening moves out of registry with the delivery means, and a release member carried by the last mentioned means to engage the releasable holding means for the second plate after the first plate has moved a distance so that the second plate may move with its opening in registry with the opening of the first plate.

5. In a machine of the class described, a base, a delivery means associated with the base, a plate slidably associated with the base in one direction and having an opening normally registered with the delivery means, a second plate slidably mounted to move in a direction rectangular to the direction of movement of the first plate and provided with an opening normally out of registry with the opening of the first plate, a pin and slot connection between the two plates, spring means for normally urging the second plate to move rectangularly in relation to the first plate, releasable means for holding the second plate in its normal position, means for moving the first plate so that its opening moves out of registry with the delivery means, a release member carried by the last mentioned means to engage the releasable holding means for the second plate after the first plate has moved a distance so that the second plate may move with its opening in registry with the opening of the first plate, and a pin projectable through the openings when registered.

6. In a machine of the class described, a base, a delivery tube extending from the base, a plate slidable in the base and provided with an opening normally registered with the tube, a second plate slidable in the base and provided with an opening normally out of registry with the opening in the first plate, a third plate mounted for movement toward and away from the base, spring means normally holding the third plate a predetermined distance from the base, a pin extending from the third plate and projectable through the base, spring means normally urging the second plate to place its openings in alinement for receiving the pin, a stop on the second plate, an engaging element on the base engaging the stop to hold the second plate in its normal position, a pin and slot connection between the first and second plates normally holding the second plate with its opening out of registry with the opening in the first plate, a release rod on the third plate for freeing the engaging element from the stop when the third plate is moved toward the base whereby when said third plate is moved toward the base, the spring means will be free to actuate the second plate, standards extending from the first plate and provided with inclined edges, means on the third plate for engaging the inclined edges when moved toward the base so as to move the first plate with its openings out of registry with the tube and as the third plate is moved further the second plate will be released so as to bring its opening into registry with the opening of the first plate and as the first mentioned spring means is allowed to move the third plate away from the base, said pin and slot connection will move the first and second plates to their normal positions.

In testimony whereof I affix my signature.

ROBERT T. TUCKER.